3,248,436
**HALOGENATION OF THE DIELS-ALDER DI-
ADDUCT OF HEXACHLOROCYCLOPENTA-
DIENE AND NAPHTHALENE**
Julius Hyman, Piedmont, and Herbert P. C. Lee, Albany,
Calif., assignors to Fundamental Research Company,
Berkeley, Calif., a partnership
No Drawing. Original application Oct. 27, 1960, Ser. No.
65,285. Divided and this application Jan. 21, 1965,
Ser. No. 427,142
10 Claims. (Cl. 260—649)

The subject application is a divisional application based upon our co-pending application, Serial No. 65,285, filed October 27, 1960, now abandoned.

This invention relates to the halogenation of organic substances. More particularly, it is concerned with the bromination and iodination of a certain class of organic compounds, and most specifically to the Diels-Alder adduct of two molecules of hexachlorocyclopentadiene and one molecule of naphthalene.

In U.S. Patent No. 2,658,926 it is disclosed that two molecules of hexachlorocyclopentadiene may be added unsymmetrically to one molecule of naphthalene in a Diels-Alder (diene) synthesis. Improved methods for the bromination and iodination of this adduct, hereinafter referred to as DHA, and the new compositions of matter obtained, constitute the essence of this invention.

A principal object of the invention is therefore a new and useful process for brominating and iodinating DHA.

A further object of the invention is a process for brominating and iodinating DHA which incorporates all the reacting bromine and iodine into the DHA derivatives.

Another object of the invention is a process for brominating and iodinating DHA under unusually mild and readily controllable temperature conditions.

Another object of the invention is a process for iodinating DHA to produce compounds hitherto unobtainable.

Still another object of the invention is a process for selectively controlling the bromination and iodination of DHA to accomplish either mono- or di-halogenation or, alternately, monohalogenation and mono-nitration.

The attainment of these and other objects of the invention, both as to process and to products resulting therefrom, will be readily understood from the disclosure of this specification and the appended claims.

Bromine and iodine differ markedly from fluorine and chlorine, the other members of the halogen family, not only in their physical state, but also in their chemical reactivity. One factor doubtless responsible, in part, at least, for the decreasing chemical activity in certain types of reactions is the decrease of the oxidation potential in the order of fluorine, chlorine, bromine, and iodine.

These differences in physical state and chemical reactivity have frequently made it necessary to employ circuitous or cumbersome methods for preparing brominated or iodinated aromatic compounds, whereas the chlorinated analogues can be prepared directly with little difficulty; in some cases it has not been possible to prepare the desired iodinated compounds by presently known procedures.

Bromination of aromatic compounds generally involves the reaction of elemental bromine with the aromatic compound in the presence of a carrier such as iron bromide. The bromination of DHA, essentially by this method, is described in U.S. Patent 2,658,913. In this reaction, however, only half of the bromine is utilized, the remainder leaving the reaction as hydrogen bromide. Since bromine is a fairly expensive reagent, such losses cannot be tolerated technically; the waste hydrogen bromide is therefore recovered and converted back to bromine for further use. The equipment necessary for the recovery, however, and the processing steps involved, add to the cost of the brominated compound being produced.

Iodination of aromatic compounds frequently employs a two-phase system in which benzene or other organic solvent is the carrier for the aromatic compound to be iodinated, while the second phase comprises ordinary concentrated (70 percent) nitric acid which continuously oxidizes hydrogen iodide back to iodine and thus effects a "pressure" of cationic iodine which is considered to be the reactive species in the iodination reaction.

Such heterogeneous systems, however, tend to react slowly, and the elevated temperatures needed to effect a reasonable rate of reaction tend to produce excessive amounts of undesired nitration and oxidation by-products. In such systems, also, polyiodination is especially difficult.

The process of our invention for the halogenation of DHA constitutes a signal improvement over previous methods in that the reaction proceeds in a single phase, at temperatures only very slightly above ambient; that by-product formation is held to a minimum; and that the reactions involved can be controlled and guided at the volition of the operator to yield the specific reaction products desired.

The essence of our invention is our discovery that white fuming (98 to 100 percent) nitric acid is miscible in all proportions with methylene chloride, and that this combination reagent is an ideal vehicle for either mono- or dibrominating or iodinating DHA. Red fuming (112 to 114 percent) nitric acid may be used in place of the white fuming acid, but its added expense does not justify its use. Such solutions are excellent solvents for DHA. The solutions are stable, since methylene chloride is completely immune to attack by the acid at the reaction temperatures involved. The solutions reflux at temperatures below 55° C., thus providing means for automatic low-temperature control. At the conclusion of the reaction, the solvent, unused acid and product may be recovered without important loss.

We have found in such a system that practically complete monobromination or monoiodination of DHA may be accomplished, with only trace nitration, and using substantially stochiometric amounts of halogen, by employing a nitric acid concentration in the methylene chloride not higher than about 3 molar. Where dibromination or di-iodination is desired, a slight excess of halogen over the stoichiometric amount is necessary, and a somewhat higher concentration of nitric acid is required. This may result in a not inappreciable amount of nitration in addition to the desired halogenation; but the loss thus entailed is always considerably less expensive than the costs which would have resulted from the use of any previous preparative method where such was available. Where both halogneation and nitration are definite objectives, the concentration of nitric acid is simply increased still further. The simplicity and flexibility of our process in these respects will be seen in the examples given hereinafter.

Not only are the halogenated derivatives of DHA produced by our process of value in themselves but they are also intermediates in the preparation of other substances of potential commercial importance, e.g. dyestuff materials and pesticides. One of the most useful methods of further processing these halogenated derivatives of DHA is to subject them to pyrolytic cracking in a wiped-film molecular type still, as will be described in greater detail in connection with the examples. This pyrolysis results in the formation of the corresponding halogenated naphthalenes and the regeneration of hexachlorocyclopentadiene, both of which products may readily be separated and recovered.

The application to actual practice of the principles of our invention set forth in the foregoing discussion is illus-

3 trated by the following examples, which are obviously given for purposes of illustration, not of limitation.

EXAMPLE 1

Monobromination of DHA 1795 grams of methylene chloride was placed in a 4-liter resin kettle equipped with mechanical stirrer and double reflux condensers. To this was added 674 grams (1 mole) of DHA, all of which did not go into solution at once. Next, 84 grams (about 0.525 mole) of bromine was introduced; and finally 183 grams of white fuming nitric acid (99 percent) was added resulting in a 2 molar acid concentration with respect to methylene chloride. The mixture was refluxed for 16 hours at 43 to 45° C.; there was a copious evolution of nitrogen oxides. At the end of 16 hours, 112.5 grams more of white fuming nitric acid was added, bringing up the calculated original acid concentration to 3 molar with respect to methylene chloride. Refluxing was continued for an hour. The reaction mixture was then distilled, to remove nearly all of the methylene chloride and nitric acid, which were recovered for reuse. The reaction mixture was then washed by shaking with an aqueous solution of sodium bisulfite to neutralize any residual bromine, then washed with water, and finally distilled to remove the remaining methylene chloride, and filtered. The residual product consisted of 720 grams of mono-bromo-DHA, pure but for trace amounts of DHA and nitro-DHA, with a yield equivalent to 95.5 percent of the theoretical.

EXAMPLE 2

Dibromination of DHA 898 grams of methylene chloride was placed in a 2-liter resin kettle fitted with double reflux condensers and mechanical stirrer. To this was added 337 grams (0.5 mole) DHA. Next, 88 grams (0.55 mole) of bromine was introduced and, finally, 91.5 grams of white fuming (99 percent) nitric acid, resulting in a 2 molar acid solution. The mixture was heated at reflux temperature (43 to 45° C.) for 16 hours. At the end of this time 55.5 grams more of nitric acid was added, bringing the calculated acid concentration up to 3 molar; and the mixture was then refluxed for 1 hour, at the end of which time the calculated acid concentration was increased to 6 molar by adding 193.5 grams more of nitric acid. Heating at reflux temperature was then continued for 15 hours. The reaction mixture was then worked up according to the procedure described in Example 1 above. The residual product recovered consisted of 247 grams of pure solid dibromo-DHA which crystallized from solution, corresponding to a yield of 59.4 percent of the theoretical (based on the weight of the DHA employed), and, in addition, 117 grams of mother liquor containing mostly dibromo-DHA, some bromo-nitro-DHA, and a trace of monobromo-DHA.

EXAMPLE 3

Mono-iodination of DHA

In a 2-liter resin kettle fitted with mechanical stirrer and long reflux condenser was placed 898 grams of methylene chloride. To this was added 337 grams (0.5 mole) of DHA, not all of which dissolved. Next, 66.7 grams of iodine (0.2625 mole) was added, followed by 91.5 grams of nitric acid (99 percent) to make a 2 molar acid solution. The reaction mixture was refluxed for 16 hours at 43 to 45° C., this temperature being maintained automatically by the evaporation and condensation of the methylene chloride. At the end of the 16 hour period 57.0 grams of 99 percent nitric acid was added, bringing the calculated acid concentration up to 3 molar. The reaction mixture was refluxed for 4 hours more and was then worked up by the procedure set forth in Example 1 above. The residual product weighed 390 grams and consisted of mono-iodo-DHA, a yield equivalent to 97.5 percent of the theoretical obtainable.

EXAMPLE 4

Di-iodination of DHA

In a 4-liter resin kettle fitted with mechanical stirrer and double reflux condenser was placed 1795 grams of methylene chloride. To this was added with stirring 674 grams (1 mole) of DHA. Next was added 280 grams (approximately 1.1 mole) of iodine, and finally 291 grams of white fuming (99 percent) nitric acid, making the calculated acid concentration 3 molar. The reaction mixture was heated at reflux temperature (43 to 45° C.) for 16 hours, at the end of which time the calculated acid concentration was increased to 4 molar by the addition of 114 grams of 99 percent nitric acid. Refluxing was then continued for an additional period of 24 hours. The reaction mixture was then worked up as in Example 1. There was recovered from the residual product a total of 750 grams of di-iodo-DHA, equivalent to 81 percent, based on the weight of the DHA employed in the reaction. The remainder was iodo-nitro-DHA.

EXAMPLE 5

Bromonitration of DHA

The monobromination of DHA described in Example 1 was repeated, and with the same quantities of reactants used therein, up to the point where monobromination was complete. The calculated acidity of the reaction mixture was then increased to 7 molar by the addition of 270 grams of 99 percent nitric acid. Refluxing was then continued for 4 hours. The reaction mixture was then worked up as in Example 1. The residual product contained a total of 780 grams of bromo-nitro-DHA, equivalent to 98 percent of the theoretical yield, based on the weight of DHA employed in the reaction.

EXAMPLE 6

Iodonitration of DHA

The mono-iodination of DHA described in Example 3 was repeated, and with the same quantities of reactants used therein, up to the point where mono-iodination was complete. The calculated acidity of the reaction mixture was then increased to 7 molar by the addition of 270 grams of 99 percent nitric acid. Refluxing was then continued for 1 hour. The reaction mixture was then worked up as in Example 1. The residual product yielded 395 grams of 2-iodo-3-nitro-DHA, equivalent to 93 percent of the theoretical, based on the weight of the DHA employed in the preparation.

As indicated earlier in this specification, the halogenated and halo-nitrated derivatives of DHA prepared according to the process of our invention are of commercial importance not only in themselves but also as intermediates in the preparation of other potentially valuable compounds. Of particular interest are the compounds obtained by the pyrolytic cracking of the DHA derivatives. We have found that pyrolytic cracking in a wiped-film molecular type still under reduced pressure is particularly advantageous and results in maximum yields and minimum undesired decomposition.

Typical conditions we have employed for carrying out the pyrolytic cracking are as follows: The DHA derivative to be cracked is dissolved in a solvent such as methylene chloride or is slurried with a suitable carrier liquid such as the liquid chlorinated naphthalenes and diphenyls, or hexachlorobutadiene. In any case, the solvent or carrier liquid must be inert toward the product of pyrolysis and thermally stable at the cracking temperatures employed. We prefer in general to employ a slurry using about 3 to 5 or more parts by weight of hexachlorobutadiene to 1 part of the DHA derivative, the proportions being adjusted to provide proper fluidity for satisfactory still operation. The cracking still is heated to and maintained at an outside wall temperature of about 375 to 450° C., and is operated preferably under reduced pressure of the order of 20 to 30 inches of vacuum. Maintenance of the 375 to 450° C. temperature is accomplished by adjusting the rate of flow of the slurry through the still. Using a still 2 inches in diameter and 8 inches high, slurries of 500 grams of the DHA derivatives in hexachlorobutadiene have been put through the still in from 2 to 4 hours, equivalent to a throughput of the DHA derivative of about 4 to 2 grams of DHA derivative per minute.

Pyrolytic cracking under these conditions of the halogenated and halo-nitrated derivatives of DHA prepared according to the examples given above results in the formation of the corresponding halogenated or halo-nitrated derivatives of naphthalene and the regeneration of hexachlorocyclopentadiene used originally in the formation of the DHA. Thus, is addition to the regeneration of the hexachlorocyclopentadiene in all cases, the pyrolytic cracking accomplishes the conversion of the monobromo-DHA of Example 1 to 2-bromonaphthalene; the dibromo-DHA of Example 2 to 2,3-dibromonaphthalene; the mono-iodo-DHA of Example 3 to 2-iodo-naphthalene; the di-iodo-DHA of Example 4 to 2,3-di-iodo-naphthalene; the 2-bromo-3-nitro-DHA of Example 5 to 2-bromo-3-nitronaphthalene; and the 2-iodo-3-nitro-DHA of Example 6 to 2-iodo-3-nitronaphthalene.

To the best of our knowledge, 2,3-di-iodonaphthalene, prepared from di-iodi-DHA as described above, has never been prepared hitherto by any method. 2,3-di-iodo-naphthalene may be used, for example as a dyestuff intermediate and in the formulation of pesticides.

All modifications and ramifications of our invention which will naturally suggest themselves to one skilled in the art as a result of the disclosure in this application are deemed to be comprehended within the scope of this invention as limited only by the claims.

We claim:

1. A process for preparing a halogenated derivative of the Diels-Alder adduct, 1,2,3,4,5,6,7,8,13,13,14,14-dodecachloro - 1,4,4a,4b,5,8,8a,12b - octahydro - 1,4;5,8-dimethanotriphenylene, comprising reacting said adduct with a halogen taken from the class consisting of bromine and iodine, in a solution of fuming nitric acid in methylene chloride, the mole ratio of the halogen to the adduct being about 1:2, and the concentration of the nitric acid being not greater than about 3 molar.

2. A process for preparing a halogenated derivative of the Diels-Alder adduct, 1,2,3,4,5,6,7,8,13,13,14,14-dodecachloro - 1,4,4a,4b,5,8,8a,12b - octahydro - 1,4:4,8-dimethanotriphenylene, comprising reacting said adduct with a halogen taken from the class consisting of bromine and iodine, in a solution of fuming nitric acid in methylene chloride, the mole ratio of the halogen to the adduct being about 1:2, and the concentration of the nitric acid being not greater than about 3 molar, said fuming nitric acid being white fuming nitric acid containing about 98 to 100% $HNO_3$.

3. A process for preparing a halogenated derivative of the Diels-Alder adduct, 1,2,3,4,5,6,7,8,13,13,14,14-dodecachloro - 1,4,4a,4b,5,8,8a,12b - octahydro - 1,4;5,8-dimethanotriphenylene, comprising reacting said adduct with a halogen taken from the class consisting of bromine and iodine, in a solution of fuming nitric acid in methylene chloride, the mole ratio of the halogen to the adduct being about 1:2, and the concentration of the nitric acid being not greater than about 3 molar, the temperature at which the halogenation is effected being maintained automatically below 55° C. by the refluxing of the methylene chloride.

4. A process for preparing a halogenated derivative of the Diels-Alder adduct, 1,2,3,4,5,6,7,8,13,13,14,14-dodecachloro - 1,4,4a,4b,5,8,8a,12b - octahydro-1,4;5,8-dimethanotriphenylene, comprising reacting said adduct with bromine in a solution of fuming nitric acid in methylene chloride, the mole ratio of bromine to the adduct being about 1:2, and the concentration of the nitric acid being not greater than about 3 molar.

5. A process for preparing a halogenated derivative of the Diels-Alder adduct, 1,2,3,4,5,6,7,8,13,13,14,14-dodecachloro - 1,4,4a,4b,5,8,8a,12b - octahydro-1,4;5,8-dimethanotriphenylene, comprising reacting said adduct with iodine in a solution of fuming nitric acid in methylene chloride, the mole ratio of iodine to the adduct being about 1:2, and the concentration of nitric acid being not greater than about 3 molar.

6. A process for preparing a halogenated derivative of the Diels-Alder adduct, 1,2,3,4,5,6,7,8,13,13,14,14-dodecachloro - 1,4,4a,4b,5,8,8a,12b - octahydro-1,4;5,8-dimethanotriphenylene, comprising reacting said adduct with a halogen taken from the class consisting of bromine and iodine, in a solution of fuming nitric acid in methylene chloride, the mole ratio of the halogen to the adduct being about 1:1, and the concentration of the nitric acid being from about 3 to about 6 molar.

7. A process for preparing a halogenated derivative of the Diels-Alder adduct, 1,2,3,4,5,6,7,8,13,13,14,14-dodecachloro - 1,4,4a,4b,5,8,8a,12b - octahydro-1,4;5,8-dimethanotriphenylene, comprising reacting said adduct with a halogen taken from the class consisting of bromine and iodine, in a solution of fuming nitric acid in methylene chloride, the mole ratio of the halogen to the adduct being about 1:1, and the concentration of the nitric acid being from about 3 to about 6 molar, said fuming nitric acid being white fuming nitric acid containing about 98 to 100% $HNO_3$.

8. A process for preparing a halogenated derivative of the Diels-Alder adduct, 1,2,3,4,5,6,7,8,13,13,14,14-dodecachloro - 1,4,4a,4b,5,8,8a,12b - octahydro-1,4;5,8-dimethanotriphenylene, comprising reacting said adduct with a halogen taken from the class consisting of bromine and iodine, in a solution of fuming nitric acid in methylene chloride, the mole ratio of the halogen to the adduct being about 1:1, and the concentration of the nitric acid being from about 3 to about 6 molar, the temperature at which the halogenation is effected being maintained automatically below 55° C. by the refluxing of the methylene chloride.

9. A process for preparing a halogenated derivative of the Diels-Alder adduct, 1,2,3,4,5,6,7,8,13,13,14,14-dodecachloro - 1,4,4a,4b,5,8,8a,12b - octahydro-1,4;5,8-dimethanotriphenylene, comprising reacting said adduct with bromine in a solution of fuming nitric acid in methylene chloride, the mole ratio of the bromine to the adduct being about 1:1, and the concentration of the nitric acid being from about 3 to about 6 molar.

10. A process for preparing a halogenated derivative of the Diels-Alder adduct, 1,2,3,4,5,6,7,8,13,13,14,14-dodecachloro - 1,4,4a,4b,5,8,8a,12b - octahydro-1,4;5,8-dimethanotriphenylene, comprising reacting said adduct with iodine in a solution of fuming nitric acid in methylene chloride, the mole ratio of the iodine to the adduct being about 1:1, and the concentration of the nitric acid being from about 3 to about 6 molar.

References Cited by the Examiner

UNITED STATES PATENTS 2,658,913   10/1963   Hyman et al. _____ 260—648 X
3,160,653   12/1964   Benning et al. ____ 260—650 X

OTHER REFERENCES

Barber et al.: J. Chem. Soc. (London), pp. 612–15 (1944).

Beilstein: Vierte Auflage, Funfte band, p. 553 (1922).

Danish et al.: "J. Amer. Chem. Soc." vol. 76, pp. 6144–6150 (1954).

LEON ZITVER, *Primary Examiner.*

K. V. ROCKEY, *Assistant Examiner.*